US006392856B1

(12) United States Patent
Kehrli et al.

(10) Patent No.: US 6,392,856 B1
(45) Date of Patent: May 21, 2002

(54) METHOD AND SYSTEM FOR PROVIDING VOLTAGE SUPPORT TO A LOAD CONNECTED TO A UTILITY POWER NETWORK

(75) Inventors: Arnold P. Kehrli, Middleton; Bradley D. Nelson, Madison, both of WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/556,226

(22) Filed: Apr. 24, 2000

(51) Int. Cl.[7] .................................................. H02H 3/00
(52) U.S. Cl. ............................ 361/64; 361/62; 361/66; 361/93.1
(58) Field of Search .............................. 361/115, 62, 64, 361/66, 93.1, 18, 19

(56) References Cited

U.S. PATENT DOCUMENTS

| 5,514,915 A | * | 5/1996 | Kim et al. ..................... 307/64 |
| 5,642,000 A | | 6/1997 | Jean-Jumeau et al. ........ 307/31 |
| 6,025,701 A | | 2/2000 | Weinhold ..................... 323/205 |

FOREIGN PATENT DOCUMENTS

| EP | 0 552 955 | 7/1993 | ............ H03H/7/40 |
| FR | 2 604 569 | 4/1988 | ............ H02J/9/06 |
| FR | 2 766 635 | 1/1999 | ............ H02J/3/24 |

* cited by examiner

*Primary Examiner*—Stephen W. Jackson
(74) *Attorney, Agent, or Firm*—Fish & Richardson P.C.

(57) ABSTRACT

A voltage recovery system and its method of operation provides voltage protection to a load connected to a distribution network of a utility power system or network by boosting the voltage on a distribution line, during a momentary voltage sag caused by a fault or other contingency. The method includes voltage protection from a voltage recovery system to a load connected to a distribution network of a utility power network. A voltage protection characteristic required by the load is selected. On the basis of electrical characteristics of the voltage recovery system and the distribution network, a determination is made as to whether the voltage recovery system is capable of providing the required first voltage protection characteristic. Determining whether the voltage recovery system is capable of providing the required voltage protection characteristic includes determining a fault current capability characteristic of the distribution network and the maximum voltage improvement characteristic that the voltage recovery system can provide. If the voltage protection characteristic is greater than the maximum voltage improvement characteristic, the fault current capability characteristic and the maximum voltage improvement characteristic are used to determine an impedance in the form of an inductor to be added to the distribution network.

22 Claims, 5 Drawing Sheets

METHOD AND SYSTEM FOR PROVIDING VOLTAGE SUPPORT TO A LOAD CONNECTED TO A UTILITY POWER NETWORK

INCORPORATION BY REFERENCE

This application herein incorporates by reference the following applications: U.S. application Ser. No. 09/449,505, entitled "Discharging a Superconducting Magnet", filed Nov. 24, 1999; U.S. application Ser. No. 09/449,436, entitled "Method and Apparatus for Controlling a Phase Angle", filed Nov. 24, 1999; U.S. application Ser. No. 09/449,378, entitled "Capacitor Switching", filed Nov. 24, 1999; U.S. application Ser. No. 60/167,377, entitled "Voltage Regulation of a Utility Power Network", filed Nov. 24, 1999; U.S. application Ser. No. 09/449,375, entitled "Providing Power to a Utility Network", filed Nov. 24, 1999; U.S. application Ser. No. unknown, entitled "Method and Apparatus for Detecting Ground Fault Current", filed Apr. 24, 2000; U.S. application Ser. No. unknown, entitled "Phase Locked Loop Design", filed Apr. 24, 2000; and U.S. application Ser. No. unknown, entitled "D-SMES Magnet and Magnet Controller Considerations That Suggest an Approach To Magnet Current Controller Design", filed Apr. 24, 2000.

BACKGROUND

This invention relates to electric power utility networks including generating systems, transmission systems, and distribution systems serving loads. The power flowing on these networks is primarily in the form of alternating current and as such is familiar to those skilled in the art.

To remain competitive, electrical utility companies continually strive to improve system operation and reliability while reducing costs. To meet these challenges, the utility companies are developing techniques for increasing the life of installed equipment, as well as, diagnosing and monitoring their utility networks. Developing these techniques is becoming increasingly important as the size and demands made on the utility power grid continue to increase.

A utility power grid is generally considered to include both transmission line and distribution line networks for carrying voltages greater than and less than about 25 kV, respectively.

Referring to FIG. 1, a portion of a utility power network is shown to include a transmission network 10 having generators 12, substations 14, and switching stations 16, all of which are interconnected via transmission lines 18. Transmission lines 18, in general, carry voltages in excess of 25 kilovolts (kV). With reference to FIG. 1, the voltage on a particular transmission line is approximately proportional to the thickness of the associated line in the figure. The actual transmission system voltages are indicated in the accompanying key located at the lower right.

Referring to FIG. 2, an exploded portion 10a of the utility power network of FIG. 1 includes distribution lines 20 coupled to a transmission line 18 through step-down transformers 22. Each distribution line carries power to loads 24 at voltage levels less than those levels associated with transmission lines (e.g., 25 kV or less).

The utility power grid is susceptible to faults or contingencies which are a critical problem for the utility industry. In particular, when a fault occurs on the transmission grid, momentary voltage depressions are experienced, which may be problematic to loads connected to the grid.

Large industrial plants with loads above a few megawatts are typically serviced at medium voltage, 4,106V and above, and may have more than one source substation, or have more than one feeder line between the utility and their main transformer(s). While this configuration greatly improves the overall continuity of the power supply, it exposes the plant loads to short duration voltage sags caused by faults or weather related events on the parallel feeders or substations, or on the transmission system. These sags generally fall in the range of 0.2 P.U. to 0.8 P.U. of nominal voltage, and <1 second duration, although there are considerable differences from one location to another.

Most industrial sag events last less then 20 cycles or so. Yet for modern manufacturing facilities, this is more than enough to cause interrupts, especially in automated manufacturing operations, to the point where the user feels a clear cost for these power quality (PQ) events. But with load levels in the megawatt, or 10's of megawatts range, the cost of available devices to address the sag issue had formerly been far too high to contemplate.

To better understand the dynamics of a fault on a utility power system, the sequence of events on the system due to a 3-phase fault on the transmission system will now be described. For example, referring again to FIG. 1, assume the fault occurs on a portion of the transmission network remote from a segment 70. Segment 70 lies between a substation 14a and a switching station 16 of transmission line network 10. Referring to FIG. 3, the voltage profile as a function of time at substation 14a due to the fault is shown. In this particular case, the voltage drops from a nominal 115 kV to about 90 kV. It is important to appreciate that if the fault were to occur more closely to segment 70 or on the segment itself, the drop in voltage is generally much more severe, and the voltage on the line can approach zero.

In general, such a fault appears as an extremely large load materializing instantly on the transmission system. Further details as to the events which typically occur on the transmission system in response to the appearance of this very large load, are described in U.S. application Ser. No. 09/449, 435.

As discussed above, faults occurring on the utility power network have dramatic effects on the loads connected to the distribution network. Indeed, momentary voltage sags at a factory or manufacturing facility can cause production losses, scrap product, missed schedules, overtime and added maintenance, all of which add significant cost. For example, a single power failure at a semiconductor processing facility can result in the scrapping of $250,000 in semiconductor integrated circuits. Moreover, regardless of how well electric utility companies serve such factories, such events are inevitable.

Various equipment and device solutions have been developed to address these momentary voltage sags. In general, such equipment and devices mitigate the effects of these sags by injecting real and/or reactive power into the system.

Two such devices used to address grid instability problems and associated sags are the superconducting magnetic energy storage (SMES) and the PQIVR system, both products of American Superconductor Corporation, Westborough, Massachusetts. The PQIVR system focuses on maintaining power quality for a particular load and integrates energy storage and power electronics to boost utility sag events by 10–50%, at any load level to keep the load operational. A PQIVR can include a superconducting magnet which stores energy used to bridge voltage sags. When a sag is detected, the PQIVR immediately rebuilds the voltage so that the load sees only smooth, uninterrupted power. In some embodiments, the PQIVR can bridge multiple, rapid-fire events and, following any magnitude of carryover, recharge rapidly.

A SMES device is similar to the PQIVR in that it stores electrical energy in a superconducting magnet. However, unlike the PQIVR, the SMES focuses on stabilizing the entire utility power grid instead of concentrating on one industrial customer. In particular, the SMES provides power to the distribution network to stabilize the utility power network in response to a detected fault after the load is isolated from the grid. Because the SMES, like a battery, is a DC device, a power conditioning system is generally required in order to interface it to an AC utility grid. Thus, the power conditioning system generally includes DC/AC converters as well as other filtering and control circuitry.

SUMMARY

The invention features an approach for providing voltage protection to a load connected to a distribution network of a utility power system or network by boosting the voltage on a distribution line, during a momentary voltage sag caused by a fault or other contingency. By "utility power system or network", it is meant those systems or networks having at least one distribution line network coupled to a higher voltage transmission line network designed to carry a nominal voltage under normal operating conditions. The distribution line network generally includes at least one distribution line having a load and carries voltages at levels lower than those on the transmission network.

One general aspect of the invention relates to a method of providing voltage protection from a voltage recovery system to a load connected to a distribution network of a utility power network. The method includes selecting a voltage protection characteristic required by the load; and determining, on the basis of electrical characteristics of the voltage recovery system and the distribution network, whether the voltage recovery system is capable of providing the required voltage protection characteristic.

Embodiments of this aspect of the invention may include one or more of the following features.

Determining whether the voltage recovery system is capable of providing the required voltage protection characteristic includes the following steps. A fault current capability characteristic of the distribution network is determined. This characteristic is commonly referred to as the available fault current of the distribution line or the "fault MVA" of the distribution line. The maximum voltage improvement characteristic that the voltage recovery system can provide is also determined. The voltage protection characteristic (e.g., required by the customer) is compared with the maximum voltage improvement characteristic to determine whether the voltage recovery system is capable of providing the required voltage protection characteristic. If the voltage protection characteristic is greater than the needed or desired maximum voltage improvement characteristic, the fault current capability characteristic and the maximum voltage improvement characteristic are used to determine an impedance to be added to the distribution network. An electrical component (e.g., inductor) having the proper line impedance value is electrically connected within the distribution line network.

The ampacity of the distribution network (i.e., strength of the system) is determined so that the electrical component can be appropriately sized to meet the present and future ampacity of at least one load (e.g., customer facility).

The voltage recovery system is electrically connected to the distribution network between the electrical component and the utility power network to transfer real power and reactive power to the distribution network. In certain applications, power factor correction is added to the distribution line of the network. The power factor correction is in the form of at least one shunt-connected capacitive element to the distribution line. In some cases, a first capacitive element to the distribution line followed by adding, after a delay period, a second capacitive element to the distribution line. In essence, the capacitive elements are added in steps to avoid producing too large of change in voltage (increase or decrease) too quickly and to follow load changes.

Another aspect of the invention relates to a voltage recovery system for use with a utility power network that includes a transmission line network for carrying a voltage within a first predetermined voltage range and a distribution line network, electrically connected to a transmission network. The distribution network carries a voltage within a second predetermined voltage range, lower than the first predetermined voltage range, and has distribution lines coupled to at least one load. The voltage recovery system includes a voltage recovery device configured to provide real and reactive power to the distribution line network and the at least one load, and a component having an impedance value selected such that the voltage recovery device provides the real and reactive power to the distribution line at a sufficient level and for a sufficient duration to maintain the voltage at the at least one load within the second predetermined voltage range above a predetermined threshold.

Embodiments of this aspect of the invention may include the following features. The impedance value of the inductor is determined on the basis of the fault current capability characteristic and the maximum voltage improvement characteristic. The electrical component (e.g., an inductor) has an ampacity rating at least that of an ampacity rating of the distribution network (or protected load). The voltage recovery system further includes a power factor correction device (e.g., capacitive elements) connected to the distribution line. In certain applications, the power correction device includes a first capacitive element connected to the distribution line; and a second capacitive element connected to the distribution line after a delay period. The voltage recovery system can further include an inverter to control the level of real power and level of reactive power transferred between the voltage recovery system and the distribution network.

Among other advantages, a method is provided for determining whether a particular voltage protection level desired by a factory load is met by the existing distribution network. The voltage protection is generally determined by personnel at the factory load seeking to avoid production losses due to momentary voltage sags caused by faults. If the particular voltage protection desired by the factory load is not met by the existing distribution network, a voltage recovery device can be connected to the distribution line to provide additional voltage "boost" during the sag.

In addition, if the particular voltage recovery device is not capable of providing the level of protection desired by the factory load, additional impedance in the form of an inductor can be inserted in the distribution line to change the fault current capability of the distribution line, thereby improving the amount of voltage protection provided by the voltage recovery device. Thus, the voltage recovery system and its method of operation provides voltage protection to a factory load by supplying additional voltage to the distribution line in response to a detected sag event on the distribution line. Energy stored by the voltage recovery system bridges the voltage sag so that the factory load sees smooth, uninterrupted power.

Other features and advantages of the invention will be apparent from the following description of a presently preferred embodiment, and from the claims.

DETAILED DESCRIPTION

Figure 1:
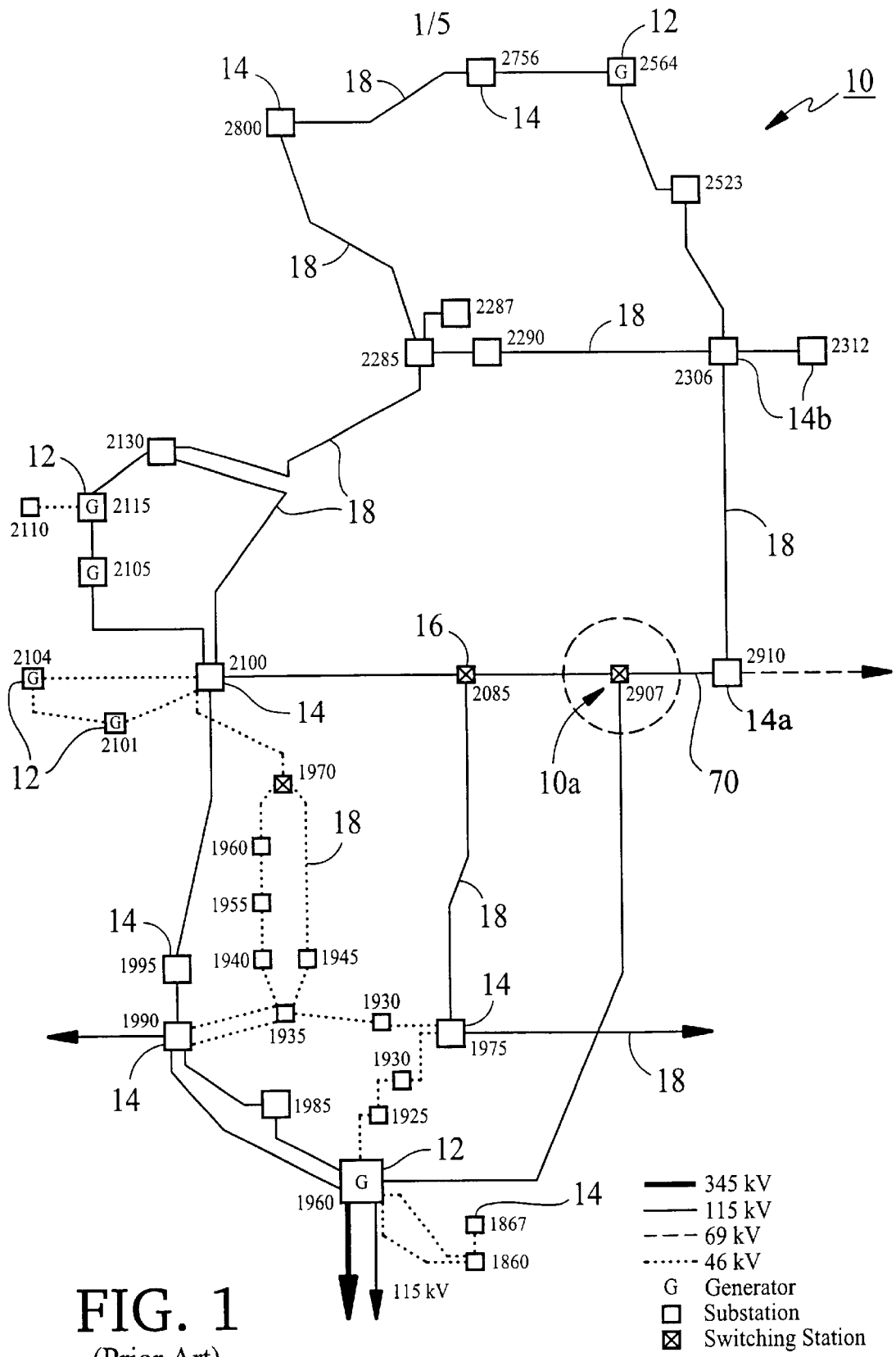
FIG. 1 is a diagrammatic representation of a portion of a transmission network of a utility power network.
Figure 2:
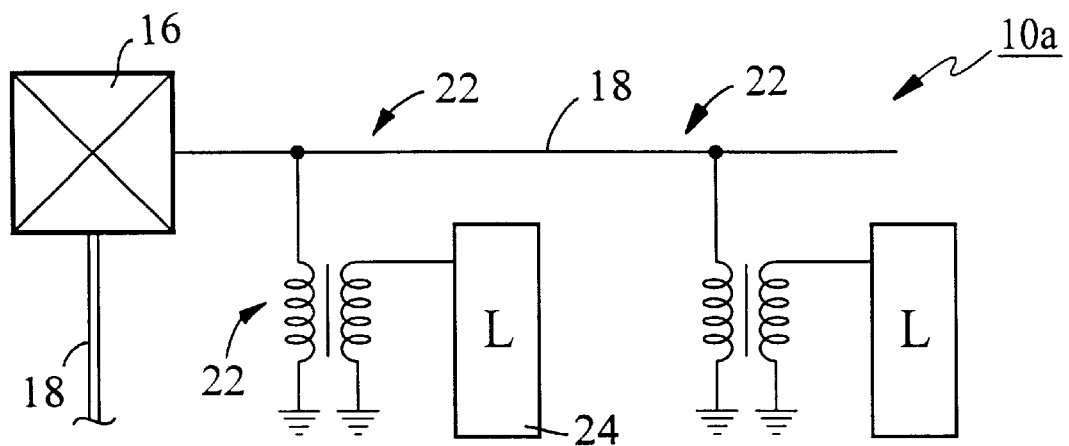
FIG. 2 is an enlarged section of the portion of the transmission network of FIG. 1 including distribution lines.
Figure 3:
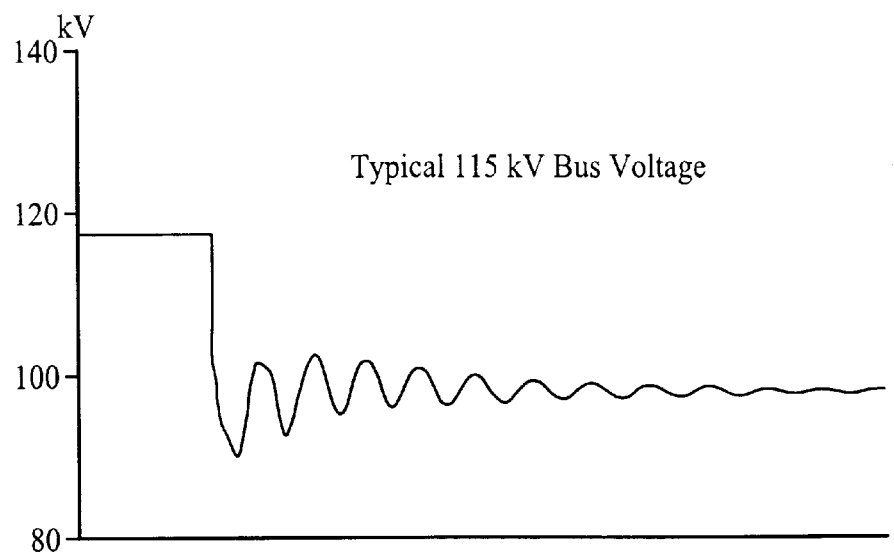
FIG. 3 is a graph illustrating the voltage profile of a section of the transmission network of FIG. 2 during a fault.
Figure 4A:
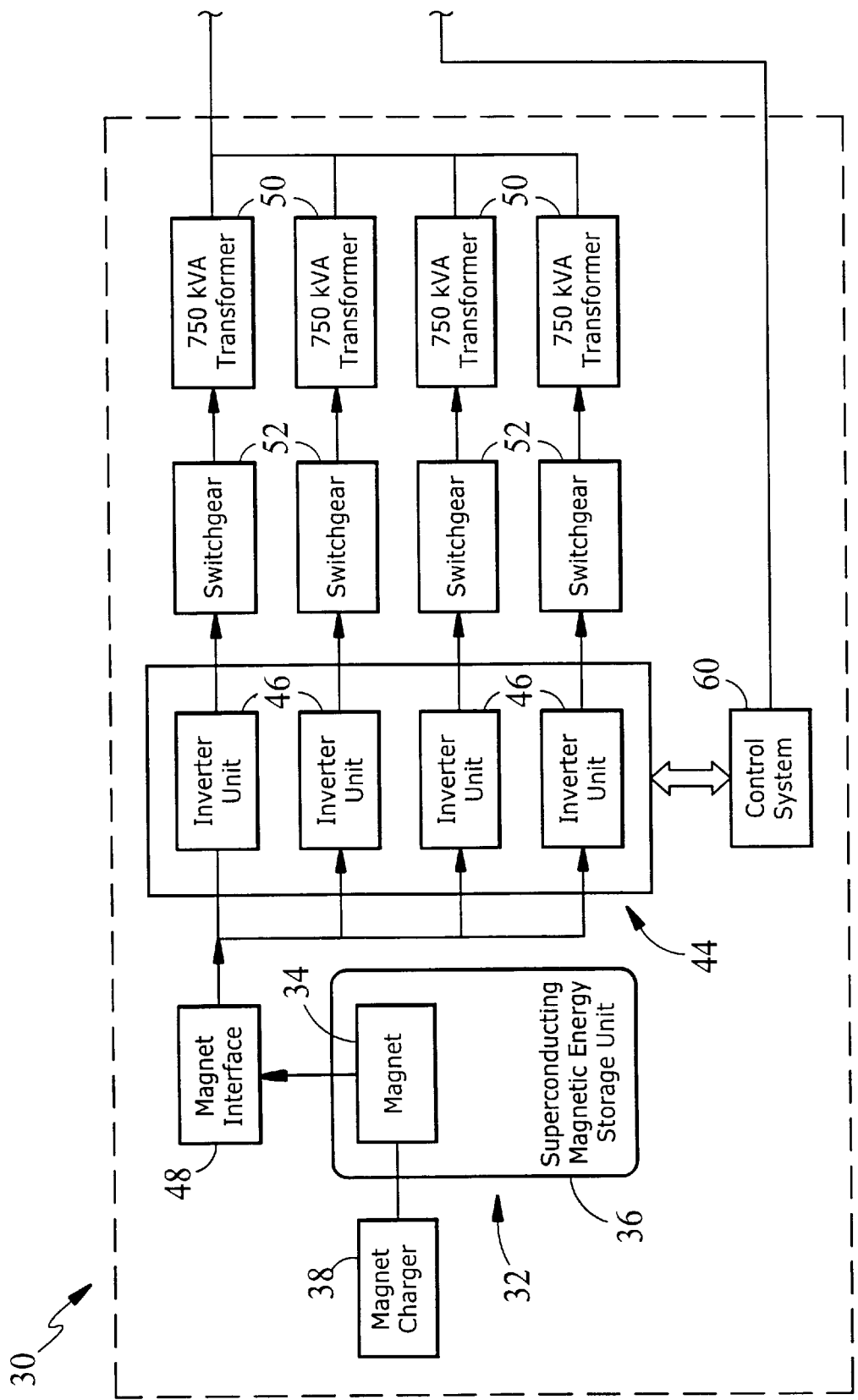
FIG. 4 is a block diagram representation of a PQIVR system in accordance with the invention.
Figure 4B:
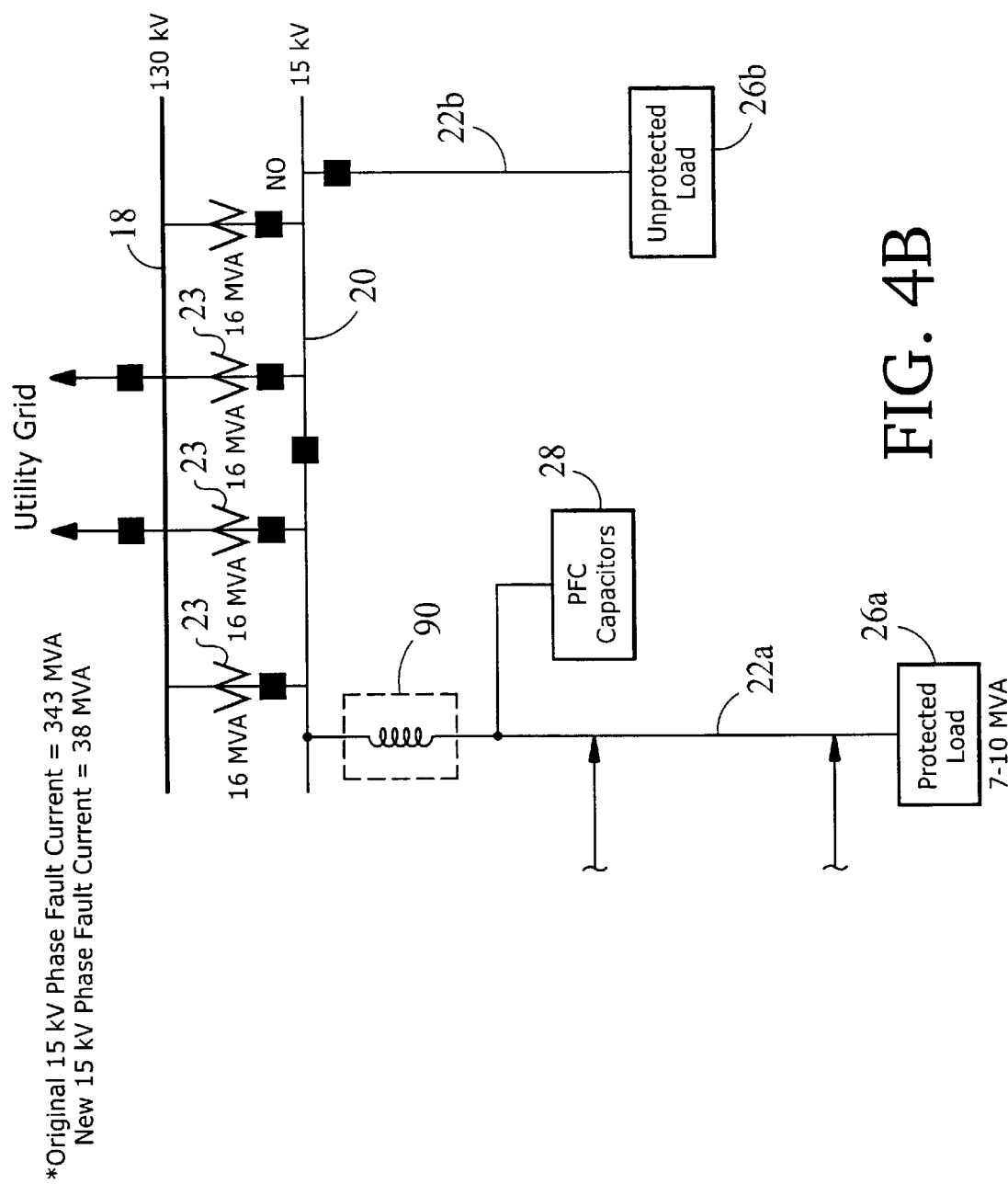

Referring to FIG. 4, a voltage recovery system, here a PQIVR system 30 of the type provided by American Superconductor Corporation, Westboro, MA, is shown connected in shunt with a distribution line 22a of a distribution line network 20. Distribution network 20 is shown connected to a transmission line 18 of the transmission line network through a first transformer 23, which steps down the higher voltage (here, 130 kV carried on transmission line 18 to a lower voltage, here 15 kV. A pair of factory loads 26a, 26b representative, for example, of industrial plants is connected to distribution lines 22a, 22b, respectively, of distribution network 20. PQIVR system 30 is connected to distribution line 22a to provide voltage support to factory load 22a. Factory load 22b is shown unprotected.

In general, PQIVR system 30 is capable of delivering both real and reactive power, separately or in combination, to distribution line 22a In this embodiment, PQIVR system 30 is sized at 8 MVA and is capable of delivering an average of 3 MWatts instantaneously, 15.6 MVARs instantaneously, and 6.8 MVARs of reactive power indefinitely. PQIVR system 30 is capable of addressing one phase, two phase, and three phase voltage sags and does so by injecting real and reactive power into those impacted phases. As will be discussed in greater detail below, the distribution line network is evaluated to determine whether PQIVR system 30 is capable of providing adequate voltage support to a factory load 26a having a particular voltage protection and system strength requirement. If PQIVR system 30 does not meet the requirement, possible changes can be made to the distribution network such that the PQIVR system provides sufficient voltage support. For reasons which will be discussed in greater detail below, a capacitor bank 28 is shown connected to distribution line 22a.

PQIVR system 30 includes a superconducting magnetic energy storage unit 32 having an energy storage magnetic coil 34 positioned within a containment vessel 36 of a cryogenic refrigeration unit. Energy storage unit 32 also includes a magnet power supply 38 for charging magnetic coil 34, positioned outside containment vessel 36. Power supply 38 is available from Dynapower Corporation of South Burlington, Vt. Containment vessel 36 maintains magnetic coil 34 in liquid helium, and is fabricated of two austenitic stainless steel vessels separated by a vacuum insulated space. In the embodiment shown, the cryogenic refrigerant unit includes one or more Gifford-McMahon type coolers (not shown), operating in concert, to maintain operating temperatures within vessel 36 and to re-liquify any helium vapor building up within the vessel. No helium (liquid or gaseous) circulates outside vessel 36 under normal operating conditions. The external, room temperature, refrigeration system gasses are not interchanged with the internal helium supply. The system design permits continued system operation, with one or both coolers inoperable, for a minimum of 48 hours.

Superconducting magnetic coil 34 is fabricated from superconducting cable formed from niobium-titanium copper-based matrix wire, cabled into a mechanically stable form, and insulated prior to winding. A superconducting magnetic coil well-suited for use with PQIVR system 30 is available from American Superconductor Corporation, Westborough, Mass. Superconducting magnetic energy storage unit 32 interfaces with an inverter system 44 through magnet interface 48 and a pair of steering diodes (not shown), which ensure that power flows only from energy storage unit 32 to inverter system 44 and not in the opposite direction.

Inverter system 44 converts DC voltage from PQIVR system 30 to AC voltage and, in this embodiment, includes one stack of four inverter units 46. For an 8 MVA PQIVR system there would be eight stacks of the inverter system 44. For simplicity sake, only one stack is shown. Other inverter systems may include larger numbers of inverter units, for example, 16–32 units. In general, inverter 44 acts as a source for any combination of both real power and reactive power. The inverter can source real power only as long as real power is available from energy storage unit 32. However, inverter 44 can source reactive power indefinitely assuming the inverter is operating at its nominally rated capacity. More accurately, inverter 44 generates reactive power, and transfers that reactive power back to the utility power network at the desired magnitude and phase. Thus, inverter 44 can provide or transfer reactive power without power from energy storage unit 32.

Figure 5:
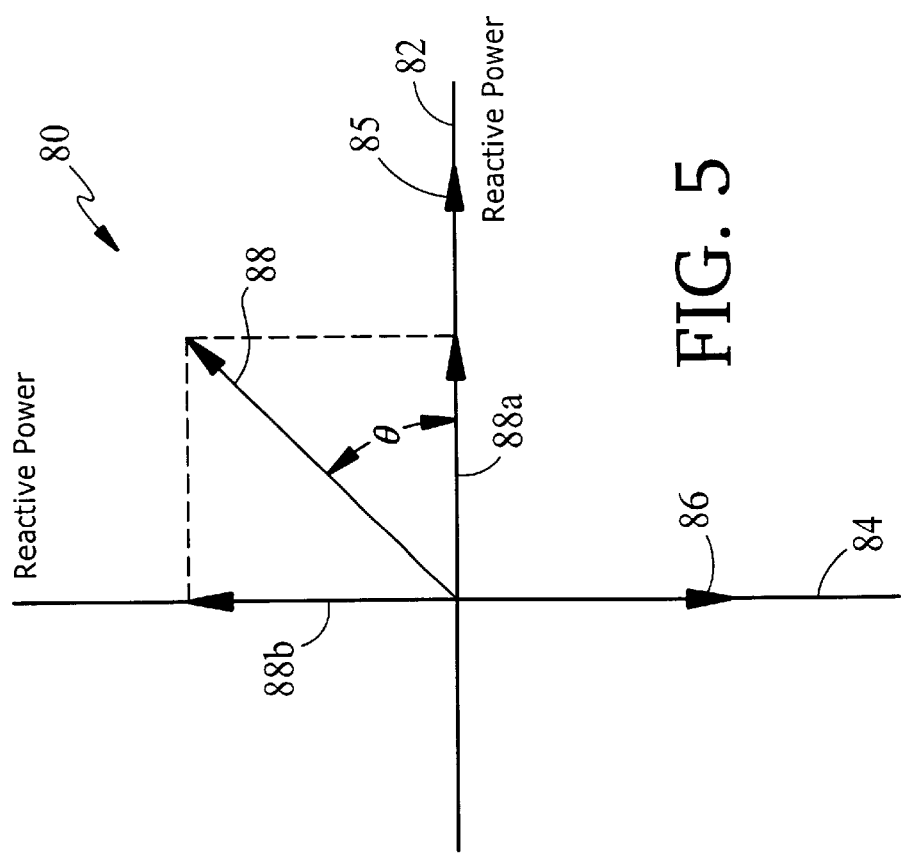
FIG. 5 is a graphical representation of vectors representing the power transferred between the utility power network and a voltage recovery device.

In essence, inverter system 44 represents a four-quadrant device capable of providing as well as absorbing power having both a real power component and a reactive power component. Referring to FIG. 5, a graph 80 having a real power axis 82 and a reactive power axis 84 can be used to illustrate a vector representation of the power transferred by the voltage recovery device 30. A vector having a magnitude and phase angle can lie in any of the four quadrants of graph 80. For example, in response to control signals from a system control unit 60 (described in greater detail below), inverter 44 can transfer power represented by vectors 85 or 86 having only a positive real power and a negative reactive power component, respectively. On the other hand, power, represented here by a vector 88, may have a real power component 88a and a reactive power component 88b. Thus, the magnitude (length of the vector) and phase angle ($\theta$) of the power can be controlled to define a predetermined locus.

In this embodiment, each inverter unit can provide between 3 MVA and 6.8 MVA of continuous power. Inverter system 44 is capable of providing 6.8 MVA continuously and 15.6 in overload for one second. The outputs of each inverter unit 44 are combined on the medium-voltage side of the power transformers to yield the system ratings in accordance with the following table.

| Power Flow | Value | Duration |
| --- | --- | --- |
| MVA delivered, leading or lagging | 6.8 | Continuously |
| MVA delivered, leading or lagging, overload condition | 15.6 | One second in event of transmission or distribution fault detection |
| Average MW delivered to utility | 2.4 | 0.6 seconds in event of transmission or distribution fault detection |

Each inverter unit 44 includes four inverter modules. Because inverter units 46 are modular in form, a degree of versatility is provided to accommodate other system ratings with standard, inverter modules. A level of fault tolerance is also possible with this modular approach, although system capability may be reduced. Each inverter module may be equipped with a local controller for managing local functions such as device protection, current regulation, thermal protection, power balance among modules, and diagnostics, among others. The inverter units, energy storage unit, and magnetic interface are mounted in racks with integral power distribution and cooling systems. The PQIVR system 30 is generally housed within a trailer to allow it to be moved from site to site.

Inverter system 44 is coupled to distribution line 20 through step-down transformers 50 and switchgear units 52. In this embodiment, each power transformer 50 is a 24.9 kV/480 V three-phase oil filled pad mount transformer having a nominal impedance of 5.75% on its own base rating. Transformers with other distribution voltage levels may be used depending upon the existing utility or customer supply voltage. The power transformers are generally mounted outdoors adjacent to the trailer with power cabling protected within an enclosed conduit (not shown).

Each switchgear unit 52 provides over-current protection between power transformers 50 and inverter units 46. Each of the four main inverter outputs feeds a circuit breaker rated at 480 V, 1,200 A RMS continuous per phase with 45 kA interruption capacity. Switchgear units 52 also serve as the primary disconnect means for safety and maintenance purposes, and may include voltage and ground fault monitoring. The switchgear units are generally mounted adjacent to the inverter unit enclosures.

System control unit 60 is a multiprocessor-driven system, which utilizes adaptive control algorithms. System control unit 60 operates as a multi-state machine for processing inputs from distribution line 22 and inverter units 46 of inverter system 44. System control unit 60, as a function of unit inputs and predetermined internal control rules, dynamically determines the phase and magnitude of inverter units 46 as well as the real power output of PQIVR module 30. System control unit 60, in operation, passes real time voltage and current waveform data to the data acquisition system for processing and transmission to monitoring sites. System control unit 60 also supports local user interfaces and safety interlocks. Control unit 60 necessarily has a response time sufficient to ensure that the transfer of power to or from PQIVR system 30 occurs at a speed to address a fault or contingency on the utility system. In general, it is desirable that the fault and resulting low voltage is detected within 1 line cycle (i.e., 1/60 second for 60 Hz, 1/50 second for 50 Hz). In one embodiment, the response time following fault detection is less than 500 microseconds. Further details of system control 60 are described in U.S. application Ser. No. 09/449,435. In addition, particular techniques for controlling inverter system 44 are described in co-pending U.S. application Ser. No. unknown, entitled, "Phase Locked Loop Design", and co-pending U.S. application Ser. No. unknown, entitled, "D-SMES Magnet and Magnet Controller Considerations That An Approach To Magnet Current Controller Design", both filed on Apr. 24, 2000 and both of which are incorporated herein by reference.

As discussed above, PQIVR system 30 is connected to a distribution line of a factory load to provide voltage support in the event of momentary voltage sags caused, for example, by a fault or contingency on the utility power network. The level of support required by a factory or facility load is often referred to as "voltage improvement." When expressed in percent units, voltage improvement represents the percentage of the nominal voltage normally delivered to the factory load for which support is desired. For example, when a factory load requests a 25% voltage improvement of an acceptable minimum threshold (e.g., .90 P.U.), the factory load is requesting that the at least or above the minimum threshold voltage at the load be maintained in the event of momentary sags of 25% or less. The level of support required by a factory load depends in large part on the particular operations performed at the facility. While one factory load can withstand sags as deep as 15%, another factory load may be able to tolerate sags of only 5–10%. This tolerance to voltage sags determines each customer's "threshold" voltage or the maximum tolerable voltage drop without causing problems. For example, a factory with a 90% threshold voltage would request a 25% voltage rebuild in order to retain at least a 90% voltage in response to an uncorrected 35% voltage dip.

In response to momentary sags, the PQIVR delivers power to the distribution line at a proper magnitude and phase to raise the voltage. Whether a particular PQIVR system is capable of providing the level of voltage improvement required by a load depends primarily on 1) the power output capability of the PQIVR and 2) the fault current capability of the distribution line. The fault current capability can also be characterized in terms of what is commonly referred to as the "fault MVA" of the line. Both of these characteristics refer generally to the ability of the line to support levels of current or apparent power.

In many cases, connecting a PQIVR system having a predetermined output power capability may not provide sufficient voltage to boost a voltage sag above the threshold value, which the factory desires the PQIVR to compensate. In these cases, a reactor element, such as inductor 90, having an appropriate impedance is inserted in the distribution line to change the fault MVA of the distribution line, such that the PQIVR system can provide sufficient voltage support.

Figure 6:
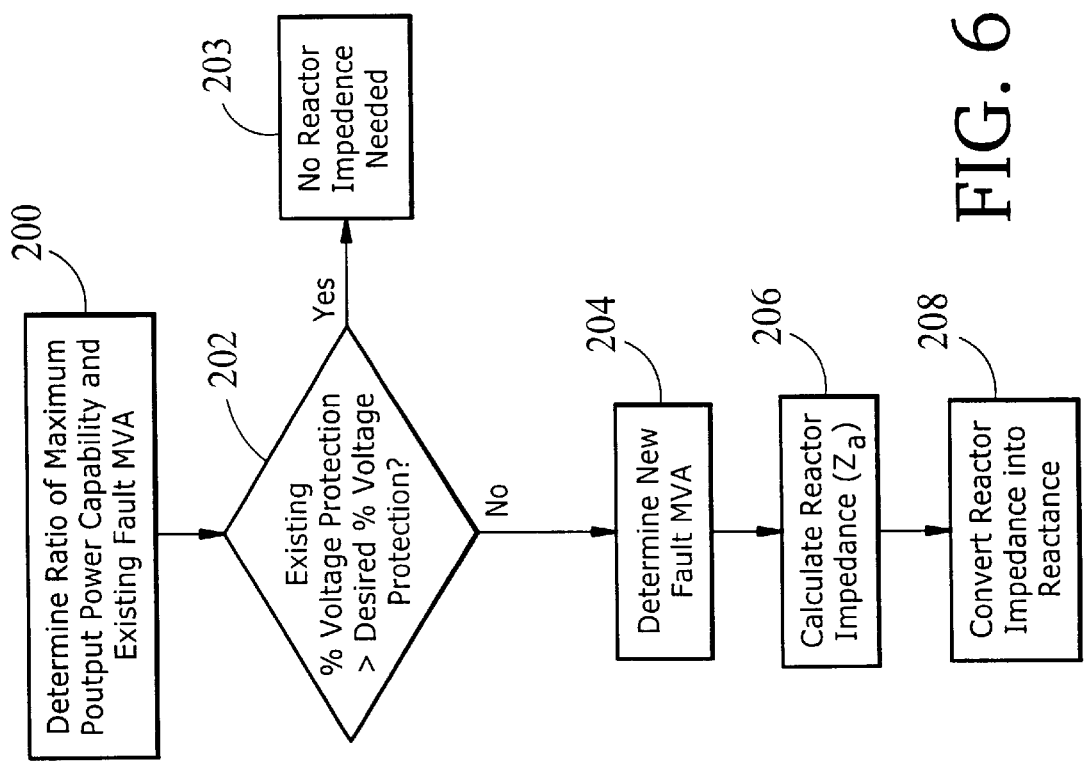
FIG. 6 is a flow diagram illustrating the general steps for determining the value of inductance to be inserted within the distribution network.

Referring to FIG. 6, a flow diagram sets forth the general approach for determining the value of inductance of the reactor element to be inserted. First, a determination is made as to whether the particular PQIVR is capable of providing the necessary voltage boost desired by the factory load. In other words, if a reactor element, here an inductor, is even necessary to change the fault MVA of the distribution line. To make this determination, the ratio of the maximum output power capability of the PQIVR and the existing fault MVA of the distribution line is determined (step 200). This ratio represents the percent voltage protection that the PQIVR is capable of providing. A comparison of the existing fault MVA is made with the desired fault MVA (step 202). If the percent voltage protection value is greater than that desired by the factory load, no inductor is needed (step 203). If, on the other hand, the percent voltage protection characteristic is less than that desired by the load, an inductor is used to change the impedance of the distribution line. In this case, a hypothetical fault MVA value which would provide the desired voltage protection characteristic given the output power capability of the PQIVR is determined (step 204). The existing and desired fault MVA characteristics are then used to calculate an impedance value (step 206) using the following equation:

$$Zr = (1/VA_{des}) - (1/VA_{ext}). \quad (1)$$

Zr is then used to determine the appropriate value of inductance (step 208) using the following equation:

$$L = Zr/(2\pi f) \quad (2)$$

where f=frequency of operation.

For illustrative purposes an example of determining the proper value of an inductor to be inserted within a distribution line will now be provided. One example, assume the following:

Max. output power capability of PQIVR: 16 MVA

Fault MVA of the distribution line: 343 MVA.

The ratio of these parameters yields a relatively low voltage improvement characteristic of 4.6%. If the factory load requires a 42% voltage improvement, and assuming that the output power capability of the PQIVR is fixed, the fault MVA would need to be reduced to 37.7 MVA.

Changing the fault MVA of the distribution line from 343 MVA to 37.7 MVA may be accomplished by adding an inductor having a particular impedance value into the distribution line. The manner in which the impedance is calculated will now be described.

Expressing the existing and desired fault MVA values in per units (p.u.) on a 100 MVA base provides the following:

Existing fault MVA (VAext): 3.43 p.u.

Desired fault MVA: (VAdes): 0.377 p.u.

The impedance value of the reactor element (Zr) which is to be added to the distribution line is calculated by substituting the above values into equation (1) above.

$$Zr = (1/0.377) - (1/3.43) = 2.361 \text{ p.u.}$$

A scaling or conversion factor, Zbase is used to convert Zr into units of ohms. Zbase for a 100 MVA base is determined as follows:

$$Zbase = Vbase/Ibase$$

$$= \frac{(V^{\Phi\Phi}(KV) \times 1000)/\sqrt{3}}{\left[\frac{(100,000,000/3)}{(V^{\Phi\Phi}(KV) \times 1000)/\sqrt{3}}\right]}$$

where: $V\Phi\Phi$ in KV is the system phase-to-phase voltage expressed in kilovolts In this case, the $V\Phi\Phi$ is 15 KV which results in a Zbase=2.25 ohms. Thus, Zr=2.361 * Zbase (ohms)=5.312 ohms.

The impedance is converted into an inductance value using equation (2) above.

In a 50 Hz system, L=16.91 mH (millihenries).

Thus, inserting an inductor having a value of 16.91 mH into distribution line 20 will allow PQIVR system 30 to provide at least a 42% voltage improvement to the customer load in the event of a fault or other contingency.

In essence, adding inductor 90 has the effect of artificially moving the factory load further away from the transmission system of the utility power network. However, it is important to appreciate that inserting an inductor within distribution line comes at some expense. In particular, adding the inductor reduces the "strength" of the system. In other words, the amount of power available at the factory load is reduced due to the addition of the impedance within the distribution line. In certain applications, this decrease in strength may be problematic. For example, if the factory load includes large electrical motors, which require high levels of current, decreasing the system strength to the point where one 8 MVA PQIVR can achieve the needed voltage improvement may not be acceptable. In these situations where one PQIVR can not satisfy the needed voltage improvement or where the system strength can not be reduced below some critical value, two or more PQIVR systems may be required in order to increase the overall available output power capability of the systems.

Moreover, because of the increased impedance of the distribution line, the voltage drop between the factory load and transmission network 18 will also increase, unless the power factor (PF) at the factory load is at or near 100%. If not, additional power factor correction in the form of capacitor bank 28 should be connected to distribution line 22a. The amount of capacitance or the amount of correction needed is equal to the actual maximum reactive load being served. The PF correction capacitors can be divided into several small capacitor banks and introduced to distribution line 22a independently to avoid producing too large of change in voltage (increase or decrease) too quickly.

Other embodiments are within the scope of the claims. For example, in the embodiment described above in conjunction with FIGS. 4–6, a PQIVR system was used to provide the real and reactive power needed to boost the voltage on the distribution line of the utility power network. However, it is important to appreciate that other voltage recovery devices capable of providing either real or reactive power, or both, including flywheels, batteries, capacitive energy storage system bank, compressed gas energy sources, and fuel cell systems (e.g., those that convert carbon based fuels into electricity and its associated energy source) are also within the scope of the invention.

What is claimed is:

1. A method of providing voltage protection from a voltage recovery system to a load connected to a distribution network of a utility power network, the method comprising:

selecting a voltage protection characteristic required by the load;

determining a fault current capability characteristic of the distribution network;

calculating a maximum voltage improvement characteristic that the voltage recovery system can provide based at least in part on the fault current capability characteristic; and comparing the voltage protection characteristic with the maximum voltage improvement characteristic to determine whether the voltage recovery system is capable of providing the required voltage protection characteristic.

2. The method of claim 1 further comprising, following the comparing step, if the voltage protection characteristic is greater than the maximum voltage improvement characteristic:

determining, from the fault current capability characteristic and the maximum voltage improvement characteristic, a line impedance value to be added to the distribution network.

3. The method of claim 2 further comprising, electrically connecting within the distribution line network an electrical component having the line impedance value.

4. The method of claim 3 further comprising determining the ampacity of the distribution network and sizing the electrical component to meet the ampacity of the distribution network.

5. The method of claim 4 wherein the electrical component is an inductor.

6. The method of claim 3 further comprising electrically connecting the voltage recovery system to the distribution network between the electrical component and the utility power network.

7. The method of claim 3 further comprising providing power factor correction to the distribution line.

8. The method of claim 7 wherein providing power factor correction to the distribution line includes connecting at least one capacitive element to the distribution line.

9. The method of claim 8 further comprising:
adding a first capacitive element to the distribution line; and
adding, after a delay period, a second capacitive element to the distribution line.

10. The method of claim 6 further comprising operating the voltage recovery device to transfer real power and reactive power to the distribution network.

11. The method of claim 10 wherein operating the voltage recovery system includes controlling an inverter to control the level of real power and level of reactive power transferred between the voltage recovery system and distribution network.

12. The method of claim 10 wherein the voltage recovery system is operated in response to a voltage sag on the distribution network.

13. A voltage recovery system for use with a utility power network including a transmission line network for carrying a voltage within a first predetermined voltage range and a distribution line network, electrically connected to a transmission network, the distribution network carrying a voltage within a second predetermined voltage range, lower than the first predetermined voltage range, and having distribution lines coupled to at least one load, the voltage recovery system comprising:
a voltage recovery device connected to the distribution network, the voltage recovery device configured to provide real and reactive power to the distribution line network and the at least on load; and
a component connected in series between the load and the distribution line network, the component having a line impedance value selected such that the voltage recovery device provides the real and reactive power to the distribution line at a sufficient level and for a sufficient duration to maintain the voltage at the at least one load within the second predetermined voltage range above a predetermined threshold.

14. The voltage recovery system of claim 13 wherein the component is an inductor.

15. The voltage recovery system of claim 14 wherein the line impedance value of the inductor is determined on the basis of the fault current capability characteristic and the maximum voltage improvement characteristic.

16. The voltage recovery system of claim 15 wherein the electrical component has an ampacity rating at least that of an ampacity rating of the at least one load.

17. The voltage recovery system of claim 14 further comprising power factor correction device connected to the distribution line.

18. The voltage recovery system of claim 17 wherein the power factor correction device include at least one capacitive element.

19. The voltage recovery system of claim 18 wherein the power correction device includes:
a first capacitive element connected to the distribution line; and
a second capacitive element connected to the distribution line after a delay period.

20. The voltage recovery system of claim 10 wherein the voltage recovery system includes an inverter to control the level of real power and level of reactive power transferred between the voltage recovery system and the distribution network.

21. The voltage recovery system of claim 13 wherein the voltage recovery system is operated in response to a voltage sag on the distribution network.

22. The method of claim 1 in which the fault current capability characteristic is a fault MVA.

* * * * *